US006202674B1

(12) United States Patent
Wingett

(10) Patent No.: US 6,202,674 B1
(45) Date of Patent: Mar. 20, 2001

(54) PRESSURE VESSEL BOTTLE MOUNT

(75) Inventor: Paul Wingett, Mesa, AZ (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/459,315

(22) Filed: Dec. 10, 1999

(51) Int. Cl.[7] ........................................ F16L 3/00

(52) U.S. Cl. ........................ 137/343; 137/899; 137/899.2; 251/143

(58) Field of Search .................................... 137/343, 899, 137/899.2; 251/143

(56) References Cited

U.S. PATENT DOCUMENTS

| | | | | |
|---|---|---|---|---|
| 2,050,521 | | 8/1936 | F.G. Chapin . | |
| 2,089,019 | | 8/1937 | H.D. Edwards . | |
| 2,913,216 | | 11/1959 | F.L. Davis . | |
| 3,627,634 | | 12/1971 | Guenther . | |
| 3,733,760 | | 5/1973 | Koerner . | |
| 3,764,036 | | 10/1973 | Dale et al. . | |
| 3,791,403 | * | 2/1974 | Folkerth | 137/343 |
| 3,910,447 | | 10/1975 | Bevilacqua . | |
| 4,253,716 | * | 3/1981 | Turner, Jr. | 312/100 |
| 4,546,895 | | 10/1985 | Pflederer . | |
| 5,396,885 | * | 3/1995 | Nelson | 128/204.18 |
| 5,584,289 | * | 12/1996 | Wise | 128/205.24 |

* cited by examiner

*Primary Examiner*—A. Michael Chambers
*Assistant Examiner*—Thomas L. McShane
(74) *Attorney, Agent, or Firm*—William J. Zak, Jr., Esq.

(57) ABSTRACT

A mounting assembly for mounting a composite pressure vessel to a vehicle includes a saddle having a curved surface extending between two pillars for receiving the vessel. The saddle also has flanged portions which can be bolted to the vehicle. Each of the pillars has hole in which is mounted the shaft portion of an attachment member. A resilient member is disposed between each of the shaft portions and the holes and loaded by a tightening nut. External to the holes, each of the attachment members has a head portion to which a steel band is attached. The steel band circumscribes the vessel and translates the load on the springs into a clamping force on the vessel. As the vessel expands and contracts, the resilient members expand and contract so that the clamping force applied by the band to the vessel remains constant.

20 Claims, 4 Drawing Sheets

PRESSURE VESSEL BOTTLE MOUNT

GOVERNMENT RIGHTS

The invention described herein was made in the performance of work under NASA Contract No. NCC8-115 and is subject to the provisions of Section 305 of the National Aeronautics and Space Act of 1958 (42 U.S.C. 2457).

TECHNICAL FIELD

This invention relates to pressure vessels and more particularly to a mounting assembly for mounting composite pressure vessels to structures.

BACKGROUND OF THE INVENTION

In many aircraft and spacecraft the flight control surface, (flaps), are positioned by pneumatic actuators. A pneumatic actuator is an actuator that is operates by high pressure gas. The high pressure gas is commonly stored in steel bottles that are directly bolted to some structure on the aircraft or spacecraft. A disadvantage to using these steel vessels is their weight.

Because keeping the weight of the spacecraft as low as possible is a critical design goal, it has been proposed to replace the steel vessels with composite vessel that weighs substantially less. A problem with using composite vessels is that it is difficult to make such vessels with lugs or other integral attachment devices.

Accordingly, a need exists for a mounting assembly for mounting a composite bottle or pressure vessel to a structure. The assembly must be able to accommodate the expansion and contraction of the vessel as it fills and empties.

SUMMARY OF THE INVENTION

An object of the present invention is to provide a mounting assembly for mounting a composite pressure vessel to a structure.

Another object of the present invention is to provide a mounting assembly for mounting a composite pressure vessel to a structure that accommodates the expansion and contraction of the vessel as it fills and empties.

The present invention meets these objects by providing a mounting assembly for a composite pressure vessel comprising a saddle having a curved surface extending between two pillars for receiving the vessel. The saddle also has flanged portions which can be bolted to the vehicle. Each of the pillars has hole in which is mounted the shaft portion of a attachment member. A resilient member is disposed between each of the shaft portions and the holes and loaded by a tightening nut. External to the holes, each of the attachment members has a head portion to which a steel band is attached. The steel band circumscribes the vessel and translates the load on the resilient members into a clamping force on the vessel. As the vessel expands and contracts, the resilient members expand and contract so that the clamping force applied by the band does not significantly change These and other objects, features and advantages of the present invention are specifically set forth in or will become apparent from the following detailed description of a preferred embodiment of the invention when read in conjunction with the accompanying drawings.

DESCRIPTION OF THE PREFERRED EMBODIMENT

Figure 1:
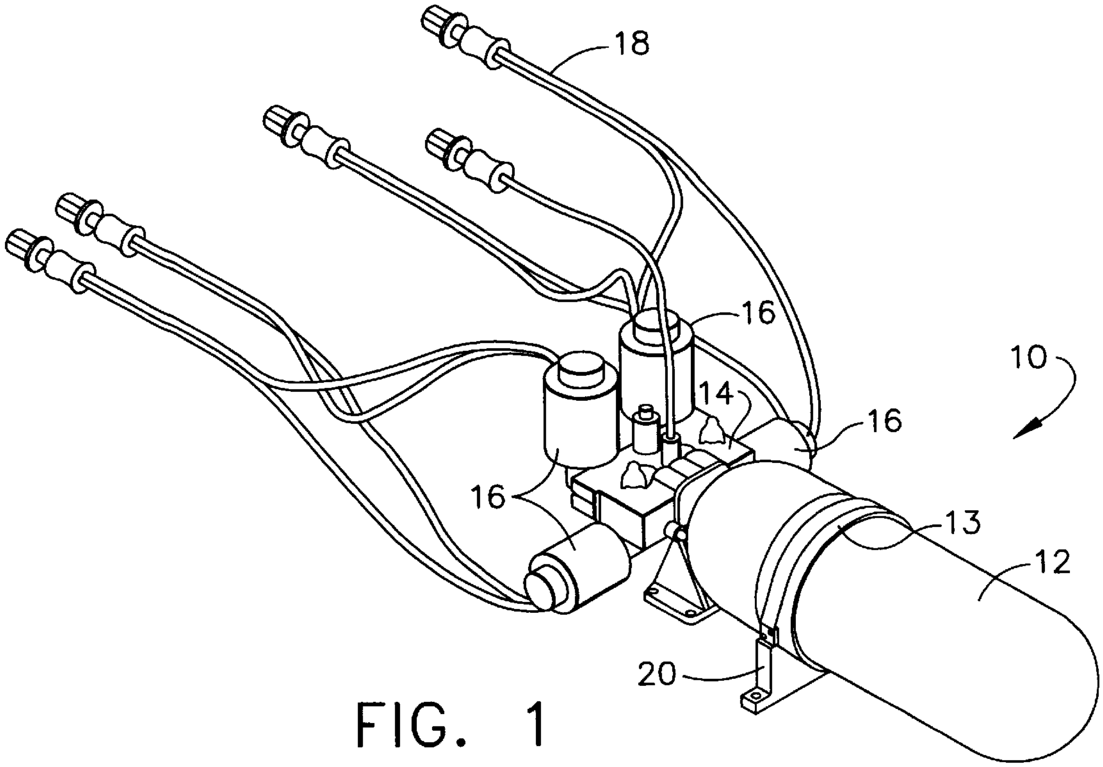
FIG. 1 is a perspective view of a pressure vessel system having the mounting assembly contemplated by the present invention.

Referring to FIG. 1, a pressure vessel system for use in an aircraft or spacecraft or any other vehicle where minimum weight is a key design objective and pneumatic power is required, is generally denoted by reference numeral 10. The system 10 includes a pressure vessel also called a bottle 12 made of a composite material which in the preferred embodiment is an aluminum liner covered with graphite fibers and epoxy. A manifold 14 is coupled to the mouth of the bottle for directing of the flow of pressurized gas from the bottle to pneumatic actuators, (not shown). Four solenoids 16 control the operation of the manifold and receive current through wires and connectors 18. A mounting assembly 20 is used to mount the bottle 12 to some structure on the vehicle, not shown.

Figure 5:
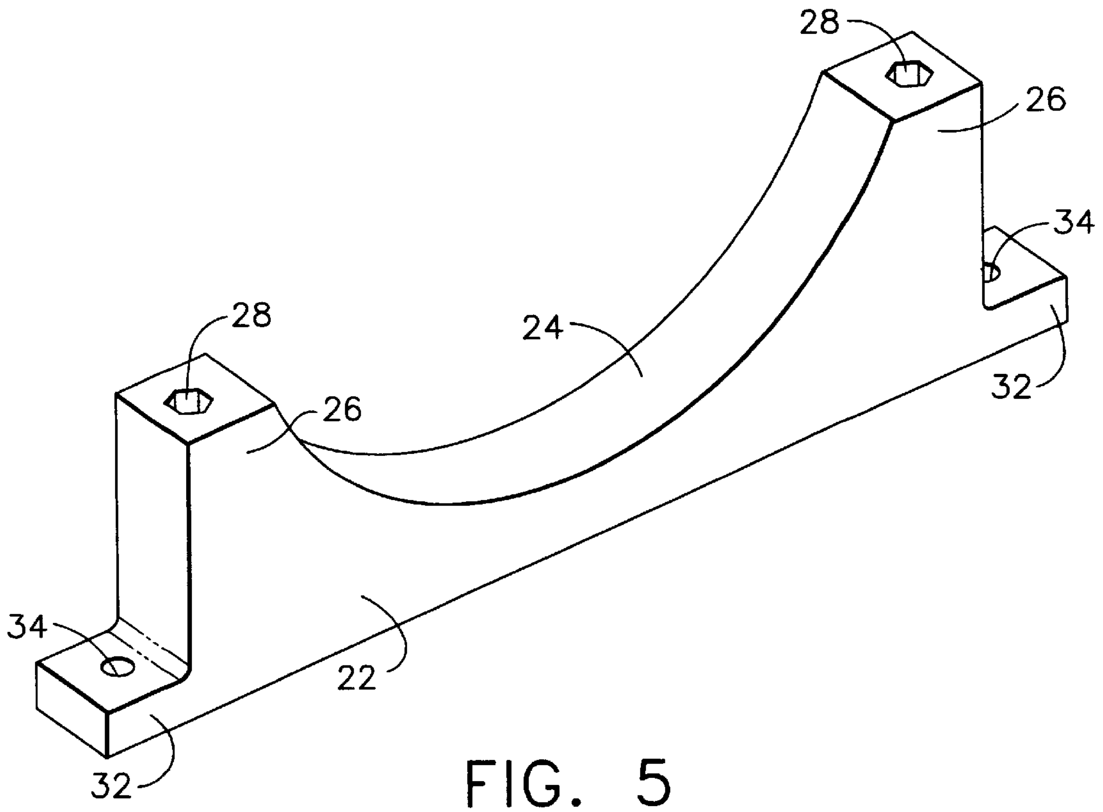
FIG. 5 is a perspective view of the saddle of the mounting assembly contemplated by the present invention.
Figure 6:
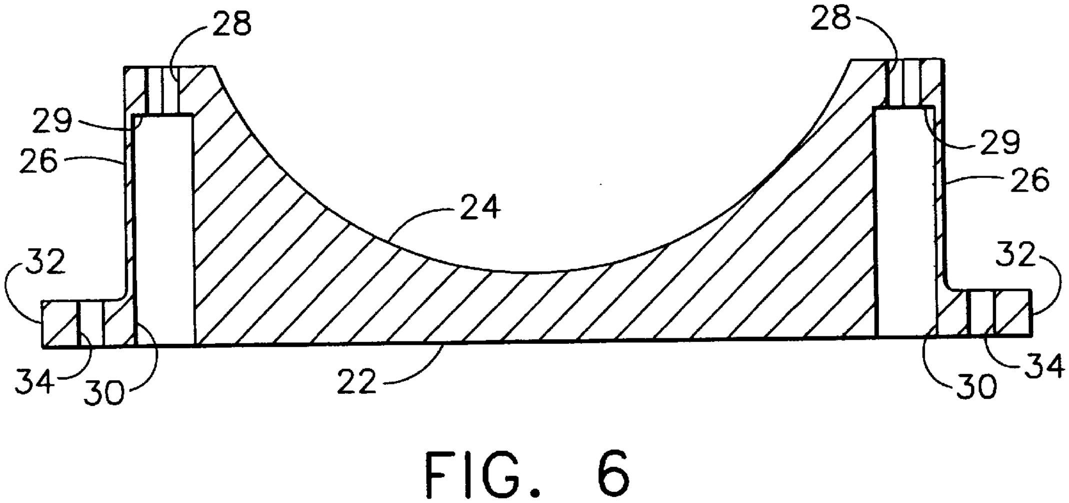
FIG. 6 is a cross sectional view of the saddle of FIG. 5.

Referring to FIGS. 5 and 6, the mounting assembly 20 includes a saddle 22. The saddle 22 has a surface 24 curved to receive the bottle 12. The curved surface 24 extends between two pillars 26 which are identical within manufacturing tolerances. Each of the pillars 26 has a hole having a top portion 28 with a hexagon shape and a bottom portion 30 with a cylindrical shape. The bottom portions 30 have larger diameters that their respective top portions 28 defining annular walls or stops 29. The saddle 22 also has two flanges 32 having bolt holes 34 for bolting the saddle to a structure on the vehicle in a manner familiar to those skilled in the art.

Figure 4:
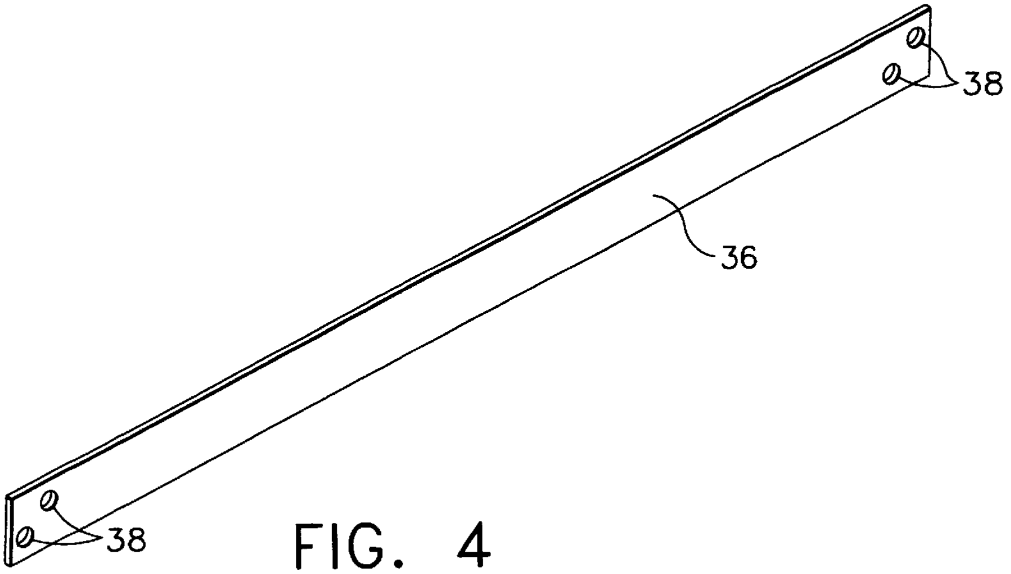
FIG. 4 is a perspective view of the band of the mounting assembly contemplated by the present invention.
Figure 7:
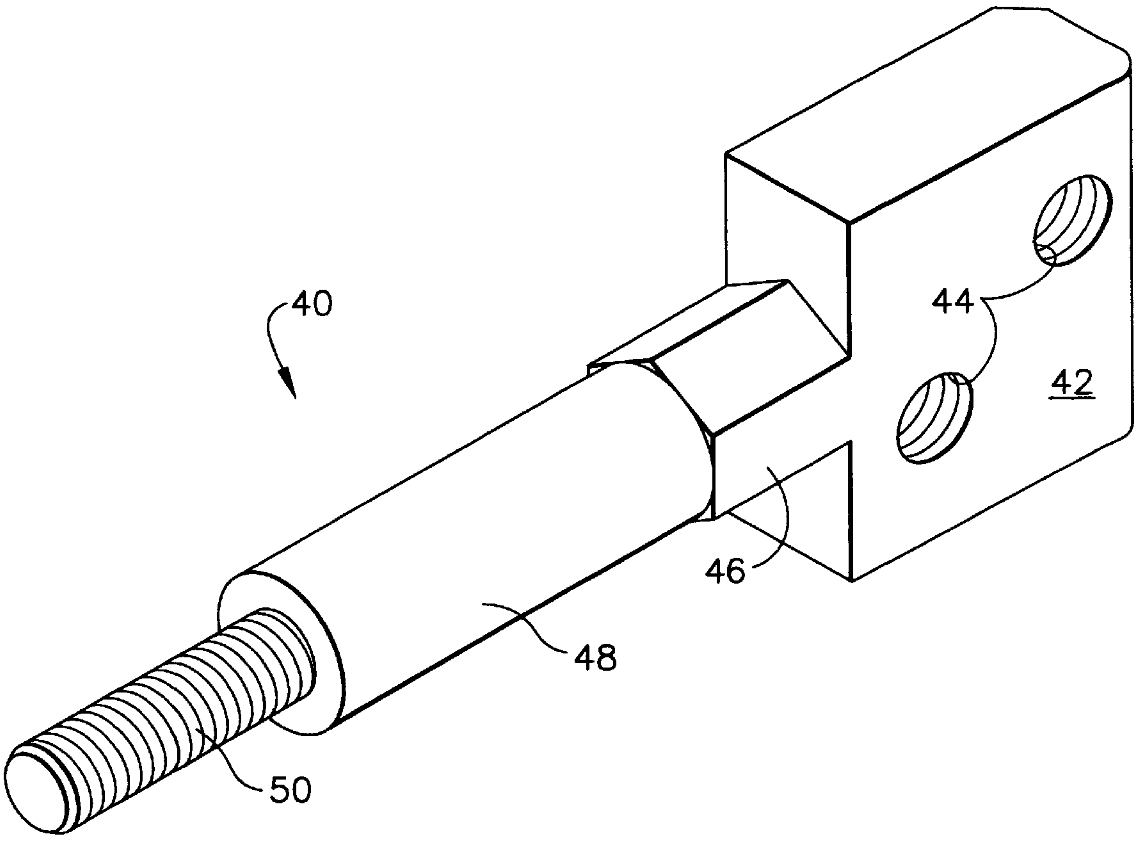
FIG. 7 is a perspective view of the band attachment member of the mounting assembly contemplated by the present invention.

Referring to FIGS. 4 and 7 the mounting assembly 20 also includes a band 36 and two band attachment members 40. The band 36 is generally rectangular and preferably made of steel. At each end of the band 36 are holes 38. The band attachment members 40 have a head portion 42 with holes 44. Extending from the head portion 42 is a shaft member having a hexagonal portion 46 followed by a cylindrical portion 48 and then a threaded portion 50. The diameter of the threaded portion 50 being less than the diameter of the cylindrical portion 48.

Figure 2:
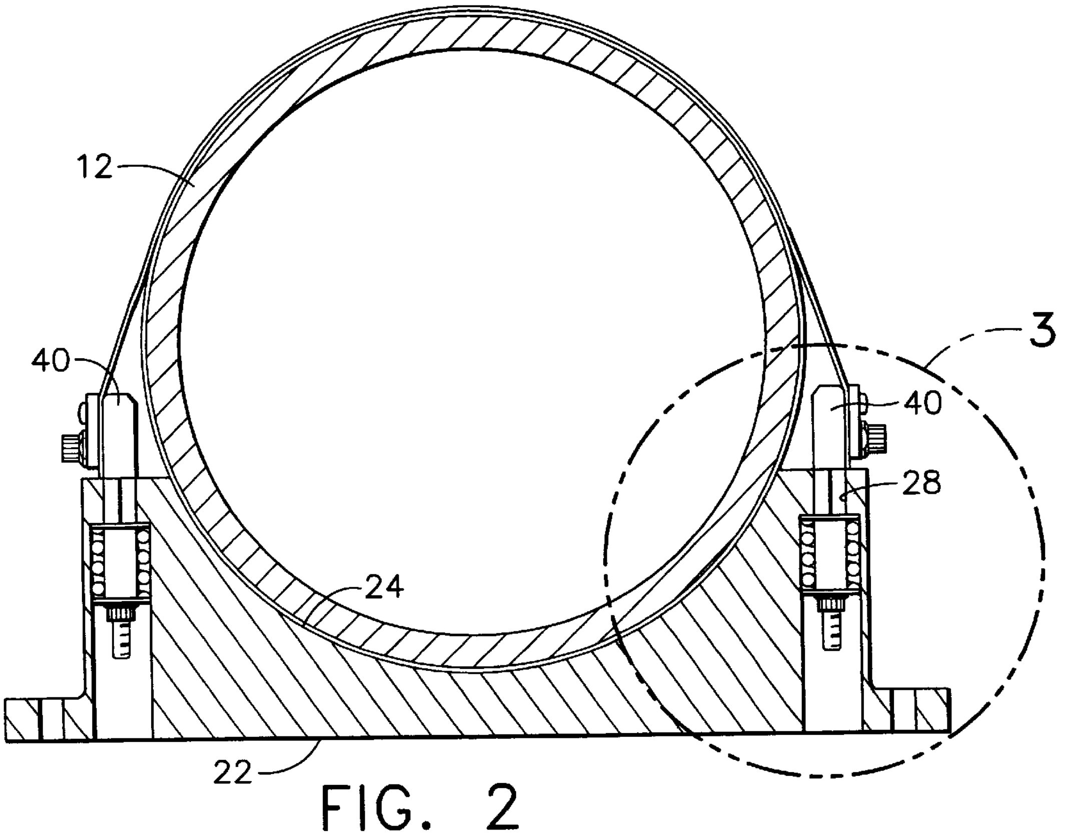
FIG. 2 is a cross-section showing the bottle and mounting assembly contemplated by the present invention.
Figure 3:
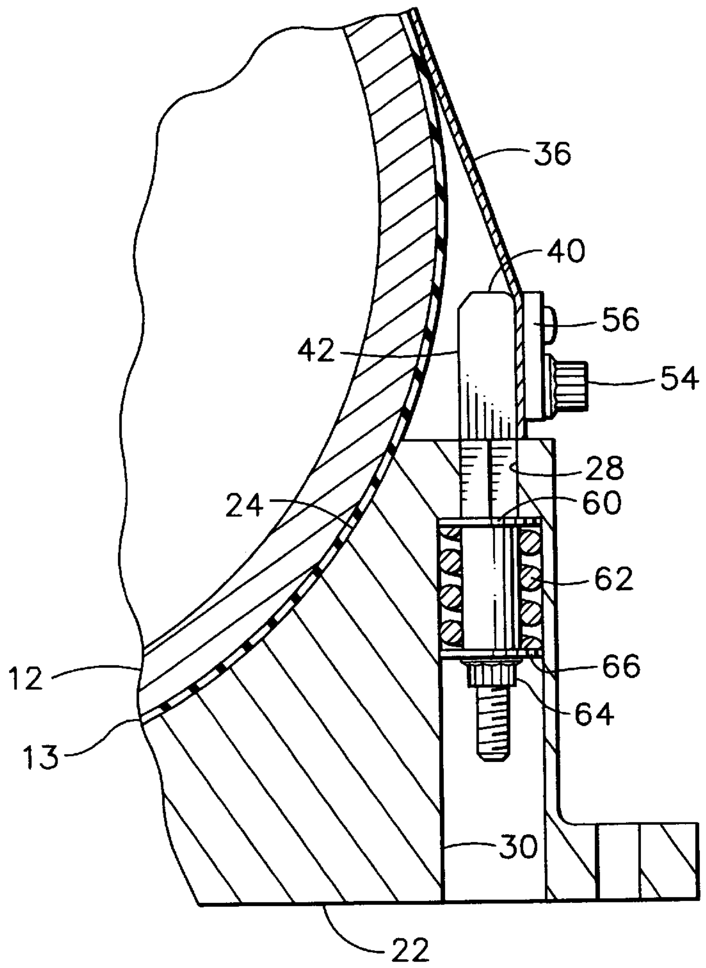
FIG. 3 is an enlarged cross section of a section identified by circle 3 in FIG. 2.

The assembled bottle and mounting assembly are shown in FIGS. 2 and 3. A washer 60 is inserted in each of the bottom portions 30 until they abut the walls 29 followed by the insertion of resilient members such as springs 62. The attachment members 40 are then inserted into each of the pillars 26 until the springs 62 surround the first cylindrical portions 48 and the top portions 28 surround the hexagonal portions 46.

A rubber isolator 13 is disposed around a portion of the bottle 12 and the bottle 12 is placed against surface 24. The band 36 is then wrapped around the isolator 13 and mounted to the head portions 44 at each end by inserting bolts 54 through holes 38 and 44. A plate 56 is disposed between the band 36 and each of the head portions 42. Nuts 64 and washers 66 are then inserted in the bottom portions 30, over the threaded cylindrical portions 50 until the washers 66 abut against the springs 62. The nuts 64 are then tightened, loading the springs 62 and thereby clamping the bottle 12 up against the surface 24.

In the preferred embodiment, the bottle 12 is empty when first attached to the saddle 22. As the bottle fills with gas, it expands as much as 0.05 inches in diameter. The springs 62 allow the band 36 to expand with bottle while maintaining a constant clamping load on the bottle. As gas is used, the bottle contracts and the springs allow the band 36 to contract while maintaining a constant clamping load.

Thus, a mounting assembly for mounting a composite pressure vessel or bottle to a structure is provided that maintains a constant clamping load on the bottle as the bottle expand and contracts.

Various modifications and alterations to the above-described preferred embodiment will be apparent to those skilled in the art. Accordingly, these descriptions of the invention should be considered exemplary and not as limiting the scope and spirit of the invention as set forth in the following claims.

What is claimed is:

1. A mounting assembly for mounting a composite pressure vessel to a structure comprising:

a saddle having a curved surface, extending between two pillars, for receiving said vessel, each of said pillars having a hole extending therethrough;

at least two attachment members, each of said attachment members having a shaft member disposed in one of said holes and mounted to a resilient member therein, and also having a head portion disposed external to said pillars; and a band attached to each of said head portions and extending around and in contact with said vessel.

2. The assembly of claim 1 wherein each of said pillar holes has a first portion and a second portion of different diameters, thereby defining annular stops against which said resilient members abut respectively.

3. The assembly of claim 2 wherein each of said first portions has a hexagonal shape.

4. The assembly of claim 3 wherein each of said second portions has a cylindrical shape.

5. The assembly of claim 4 wherein each of said second portions has a larger diameter than its respective first portion.

6. The assembly of claim 5 wherein said saddle further comprises two flanges for attaching said saddle to said structure.

7. The assembly of claim 1 wherein each of said shaft members further comprises a hexagonal shaped portion, and a cylindrical portion.

8. The assembly of claim 7 wherein each of said shaft members further comprises a threaded portion having a diameter less than the diameter of said cylindrical portion.

9. The assembly of claim 1 further comprising a rubber isolator disposed around a portion of said vessel.

10. A mounting assembly for mounting a composite pressure vessel to a structure comprising:

a saddle having a curved surface extending between two pillars for receiving said vessel, each of said pillars having a hole extending therethrough, said holes having a hexagonal shaped portion and a cylindrical portion with a diameter greater than said hexagonal shaped portion, thereby defining a stop;

at least two attachment members, each of said attachment members having a shaft member disposed in one of said holes and having a head portion disposed external to said holes, said shaft member comprising a hexagonal shaped shaft portion and a cylindrical shaft portion, each of said attachment members disposed in one of said holes so that said hexagonal shaped portion circumscribes said hexagonal shaped shaft portion and said cylindrical portion circumscribes said cylindrical shaft portion;

a resilient member disposed between each of said cylindrical portions and said cylindrical shaft portions and abutting one of said stops at one of its ends;

means for loading each of said resilient member; and a band attached to each of said head portions and extending around and in contact with said vessel.

11. The assembly of claim 10 wherein said resilient member is a spring.

12. The assembly of claim 11 wherein said each of said shaft members further comprises a threaded shaft portion having a diameter less than the diameter of said cylindrical shaft portion and extending therefrom.

13. The assembly of claim 12 wherein each of said loading means includes a tightening nut mounted to said threaded shaft portion and abutting the other end of said resilient member.

14. The assembly of claim 13 further comprising a rubber isolator disposed around a portion of said vessel.

15. The assembly of claim 10 further comprising a plate disposed between each of said head portions and said band.

16. A pressure vessel system for use in a vehicle where reduced weight is a design objective and pneumatic power is required, comprising:

a pressure vessel made of a composite material;

a manifold coupled to the mouth of the vessel for directing the flow of pressurized gas from the vessel to the vehicle;

at least one solenoid for operating said manifold;

at least one wire and connector coupled to said solenoid;

a mounting assembly for mounting said vessel to the vehicle, said mounting assembly comprising;

a saddle having a curved surface extending between two pillars for receiving said vessel, each of said pillars having a hole extending therethrough, said holes having a hexagonal shaped portion and a cylindrical portion with a diameter greater than said hexagonal shaped portion, thereby defining a stop;

at least two attachment members, each of said attachment members having a shaft member disposed in one of said holes and having a head portion disposed external to said holes, said shaft member comprising a hexagonal shaped shaft portion and a cylindrical shaft portion, each of said attachment members disposed in one of said holes so that said hexagonal shaped portion circumscribes said hexagonal shaped shaft portion and said cylindrical portion circumscribes said cylindrical shaft portion;

a resilient member disposed between each of said cylindrical portions and said cylindrical shaft portions and abutting one of said stops at one of its ends;

means for loading each of said resilient member; and a band attached to each of said head portions and extending around and n contact with said vessel.

17. The system of claim 16 wherein said composite comprises an aluminum liner covered with graphite fibers and epoxy.

18. The assembly of claim 16 wherein said each of said shaft members further comprises a threaded shaft portion having a diameter less than the diameter of said cylindrical shaft portion and extending therefrom.

19. The assembly of claim 16 wherein each of said loading means includes a tightening nut mounted to said threaded shaft portion and abutting the other end of said resilient member.

20. The assembly of claim 16 further comprising a rubber isolator disposed around a portion of said vessel.

* * * * *